United States Patent [19]
Arimilli et al.

[11] Patent Number: 6,000,014
[45] Date of Patent: *Dec. 7, 1999

[54] SOFTWARE-MANAGED PROGRAMMABLE CONGRUENCE CLASS CACHING MECHANISM

[75] Inventors: Ravi Kumar Arimilli, Austin; Leo James Clark, Georgetown; John Steven Dodson, Pflugerville; Jerry Don Lewis, Round Rock, all of Tex.

[73] Assignee: International Business Machines Corporation, Armonk, N.Y.

[ * ] Notice: This patent is subject to a terminal disclaimer.

[21] Appl. No.: 08/834,490

[22] Filed: Apr. 14, 1997

[51] Int. Cl.⁶ .................................................. G06F 12/08
[52] U.S. Cl. ........................... 711/128; 711/145; 711/118
[58] Field of Search .................................... 711/128, 122, 711/144, 171, 172, 173, 145, 118, 5; 365/49; 364/243.4; 395/564

[56] References Cited

U.S. PATENT DOCUMENTS

| | | | |
|---|---|---|---|
| 4,315,312 | 2/1982 | Schmidt .................................. | 364/200 |
| 5,014,195 | 5/1991 | Farrell et al. .......................... | 711/171 |
| 5,058,003 | 10/1991 | White ..................................... | 711/209 |
| 5,133,061 | 7/1992 | Melton et al. .......................... | 711/128 |
| 5,379,393 | 1/1995 | Yang ...................................... | 395/400 |
| 5,410,663 | 4/1995 | Blackburn et al. ..................... | 711/216 |
| 5,509,135 | 4/1996 | Steely, Jr. .............................. | 395/474 |
| 5,640,534 | 6/1997 | Liu et al. ................................ | 395/473 |
| 5,649,143 | 7/1997 | Parady ................................... | 395/421.1 |
| 5,668,972 | 9/1997 | Liu et al. ................................ | 711/136 |
| 5,890,221 | 3/1999 | Liu et al. ................................ | 711/128 |
| 5,893,930 | 4/1999 | Song ...................................... | 711/128 |

OTHER PUBLICATIONS

Cache Modeling for Real–Time Software: Beyond Direct Mapped Instruction Cache, Yau–Tsun Steven Li et al., IEEE Transactions on Computers, pp. 254–263, 1996.

Stack Evaluation of Arbitrary Set Associative Multiprocessor Caches, Yuguang Wu et al., IEEE Transactions on Parallel and Distributed Systems, vol. 6, No. 9, pp. 930–942, Sep. 1995.

Evaluating Associativity in CPU Caches, Mark D. Hill et al. IEEE Transactions on Computers, vol. 38, No. 12, pp. 1612–1630, Dec. 1989.

Sampling of Cache Congruence Classes, Lishing Liu et al., IEEE Transactions on Very Large Scale Integration (VLSI) Systems, vol. 1, No. 2, pp. 552–557, 1992.

*Primary Examiner*—John W. Cabeca
*Assistant Examiner*—Pierre-Michel Bataille
*Attorney, Agent, or Firm*—Richard A. Henkler; Jack V. Musgrove; Andrew J. Dillon

[57] ABSTRACT

A method of providing programmable congruence classes in a cache used by a processor of a computer system is disclosed. Program instructions are loaded in the processor for modifying original addresses of memory blocks in a memory device to produce encoded addresses. A plurality of cache congruence classes is then defined using a mapping function which operates on the encoded addresses, such that the program instructions may be used to arbitrarily assign a given one of the original addresses to a particular one of the cache congruence classes. The program instructions can modify the original addresses by setting a plurality of programmable fields. Application software may provide the program instructions, wherein congruence classes are programmed based on a particular procedure of the application software which is running on the processor, that might otherwise run with excessive "striding" of the cache. Alternatively, operating-system software may monitor allocation of memory blocks in the cache and provides the program instructions to modify the original addresses based on the allocation of the memory blocks, to lessen striding.

12 Claims, 5 Drawing Sheets

SOFTWARE-MANAGED PROGRAMMABLE CONGRUENCE CLASS CACHING MECHANISM

BACKGROUND OF THE INVENTION

1. Field of the Invention

The present invention generally relates to computer systems, particularly caches that are used by processors, and more particularly, to a method of making efficient use of an associative cache.

2. Description of the Related Art

The basic structure of a conventional computer system 10 is shown in FIG. 1. Computer system 10 may have one or more processing units, two of which, 12a and 12b, are depicted, which are connected to various peripheral devices, including input/output (I/O) devices 14 (such as a display monitor, keyboard, and permanent storage device), memory device 16 (such as random-access memory or RAM) that is used by the processing units to carry out program instructions, and firmware 18 whose primary purpose is to seek out and load an operating system from one of the peripherals (usually the permanent memory device) whenever the computer is first turned on. Processing units 12a and 12b communicate with the peripheral devices by various means, including a generalized interconnect or bus 20. Computer system 10 may have many additional components which are not shown, such as serial and parallel ports for connection to, e.g., modems or printers. Those skilled in the art will further appreciate that there are other components that might be used in conjunction with those shown in the block diagram of FIG. 1; for example, a display adapter might be used to control a video display monitor, a memory controller can be used to access memory 16, etc. Instead of connecting I/O devices 14 directly to bus 20, they may be connected to a secondary (I/O) bus which is further connected to an I/O bridge to bus 20. The computer also can have more than two processing units.

In a symmetric multi-processor (SMP) computer, all of the processing units are generally identical; that is, they all use a common set or subset of instructions and protocols to operate and generally have the same architecture. A typical architecture is shown in FIG. 1. A processing unit includes a processor core 22 having a plurality of registers and execution units, which carry out program instructions in order to operate the computer. An exemplary processing unit includes the PowerPC™ processor marketed by International Business Machines Corporation. The processing unit also can have one or more caches, such as an instruction cache 24 and a data cache 26, which are implemented using high-speed memory devices. Instructions and data may be directed to the respective cache 24 or 26 by examining a signal that is indicative of whether the CPU is requesting an operation whose operand is instruction versus data. Caches are commonly used to temporarily store values that might be repeatedly accessed by a processor, in order to speed up processing by avoiding the longer step of loading the values from memory 16. These caches are referred to as "on-board" when they are integrally packaged with the processor core on a single integrated chip 28. Each cache is associated with a cache controller (not shown) that manages the transfer of data between the processor core and the cache memory.

A processing unit 12 can include additional caches, such as cache 30, which is referred to as a level 2 (L2) cache since it supports the on-board (level 1) caches 24 and 26. In other words, cache 30 acts as an intermediary between memory 16 and the on-board caches, and can store a much larger amount of information (instructions and data) than the on-board caches can, but at a longer access penalty. For example, cache 30 may be a chip having a storage capacity of 256 or 512 kilobytes, while the processor may be an IBM PowerPC™ 604-series processor having on-board caches with 64 kilobytes of total storage. Cache 30 is connected to bus 20, and all loading of information from memory 16 into processor core 22 must come through cache 30. Although FIG. 1 depicts only a two-level cache hierarchy, multi-level cache hierarchies can be provided where there are many levels of serially connected caches.

A cache has many "blocks" which individually store the various instructions and data values. The blocks in any cache are divided into groups of blocks called "sets." A set is the collection of cache blocks that a given memory block can reside in. For any given memory block, there is a unique set in the cache that the block can be mapped into, according to preset mapping functions. The number of blocks in a set is referred to as the associativity of the cache, e.g., 2-way set associative means that, for any given memory block, there are two blocks in the cache that the memory block can be mapped into; however, several different blocks in main memory can be mapped to any given set. A 1-way set associative cache is direct mapped; that is, there is only one cache block that can contain a particular memory block. A cache is said to be fully associative if a memory block can occupy any cache block, i.e., there is one set, and the address tag is the full address of the memory block.

An exemplary cache line (block) includes an address-tag field, a state-bit field, an inclusivity-bit field, and a value field for storing the actual instruction or data. The state-bit field and inclusivity-bit fields are used to maintain cache coherency in a multiprocessor computer system. The address tag is a subset of the full address of the corresponding memory block. A compare match of an incoming effective address with one of the tags within the address-tag field indicates a cache "hit." The collection of all of the address tags in a cache (and sometimes the state-bit and inclusivity-bit fields) is referred to as a directory, and the collection of all of the value fields is the cache-entry array.

When all of the blocks in a set for a given cache are full and that cache receives a request, whether a "read" or "write," to a memory location that maps into the full set, the cache must "evict" one of the blocks currently in the set. The cache chooses a block by one of a number of means known to those skilled in the art (least recently used (LRU), random, pseudo-LRU, etc.) to be evicted. If the data in the chosen block is modified, that data is written to the next lowest level in the memory hierarchy which may be another cache (in the case of the L1 or on-board cache) or main memory (in the case of an L2 cache, as depicted in the two-level architecture of FIG. 1). By the principle of inclusion, the lower level of the hierarchy will already have a block available to hold the written modified data. However, if the data in the chosen block is not modified, the block is simply abandoned and not written to the next lowest level in the hierarchy. This process of removing a block from one level of the hierarchy is known as an "eviction." At the end of this process, the cache no longer holds a copy of the evicted block.

Some procedures (programs) running on a processor have the unintended effect of repeatedly using a limited number of sets (congruence classes) such that the cache is less efficient. In other words, when a procedure causes a large number of evictions in a small number of congruence class members while not using a large number of other members, there are increased memory latency delays. This effect, referred to as a stride, is related to the congruence mapping function and the manner in which the particular procedure is allocating memory blocks in the main memory device (RAM 16). The statistical advantages of using a particular associative cache break down for these types of procedures.

Another statistical advantage which sometimes breaks down relates to the provision of separate cache blocks (such as caches 24 and 26) for instructions and data. A typical processing unit provides an equal number of L1 cache blocks for instruction and data, so 50% of the available cache entries can be used at this level for instructions and 50% can be used for data. In the L2 cache, there is no differentiation, i.e., 100% of the cache at the L2 level is available for instructions and 100% is available for data. This ratio of available blocks for instruction versus data is not, however, always the most efficient usage of the cache for a particular procedure. Many software applications will perform better when run on a system with split I/D caching, while others perform better when run on a flat, unified cache (given the same total cache space). In the instances where the cache I/D ratio is not particularly close to the actual ratio of instruction and data cache operations, there are again a troubling number of evictions.

Yet another statistical advantage of an associative cache that may break down relates to the cache replacement algorithm which determines which cache block in a given set will be evicted. For example, an 8-way associative cache might use an LRU unit which examines a 7-bit field associated with the set. Due to a particular cycling frequency of the procedure running on the processor, this 7-bit LRU algorithm might result in evicting a higher number of cache blocks than might occur if the cache were 4-way associative, or 2-way associative.

It is difficult to statistically optimize associative caches because different technical applications may present different stride conditions or different instruction/data ratios. For example, a desktop publishing program, a warehouse inventory program, an aerodynamics modelling program and a server program might all present different stride conditions or ratios of instruction operations to data operations. It would, therefore, be desirable and advantageous to design a cache which can more fully optimize its statistical advantages regardless of the type of procedure running on the processor.

SUMMARY OF THE INVENTION

It is therefore one object of the present invention to provide an improved cache for a processor of a computer system.

It is another object of the present invention to provide such a cache which optimizes statistical advantages with respect to associativity.

It is yet another object of the present invention to provide such a cache which optimizes statistical advantages with respect to accessing instructions versus data.

It is still another object of the present invention to provide such a cache which optimizes statistical advantages with respect to a cache replacement (eviction) algorithm.

The foregoing objects are achieved in a method of providing congruence classes in a cache used by a processor of a computer system, generally comprising the steps of loading program instructions in the processor for modifying original addresses of memory blocks in a memory device to produce encoded addresses, and defining a plurality of cache congruence classes for memory blocks in the memory device using a mapping function which operates on the encoded addresses, such that the program instructions may be used to arbitrarily assign a given one of the original addresses to a particular one of the cache congruence classes. The program instructions can modify the original addresses by setting a plurality of programmable fields. Application software may provide the program instructions, wherein congruence classes are programmed based on a particular procedure of the application software which is running on the processor, that might otherwise run with excessive "striding" of the cache. Alternatively, operating-system software may monitor allocation of memory blocks in the cache and provides the program instructions to modify the original addresses based on the allocation of the memory blocks, to lessen striding. The program instructions can modify the original addresses by switching address bits in the original addresses.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENT

The present invention is directed to more efficient operation by a cache of a processing unit presents several methods of improving cache efficiency. One method relates to the associativity of the cache structure, and may be understood with reference to FIGS. 2a–2c, which depict different states of a single cache 40. Cache 40, which may include a cache controller (not shown), has a plurality of cache lines arranged in sets (congruence classes) to provide associativity. In the first state of cache 40 shown in FIG. 2a, there are eight cache lines in a set, e.g., cache lines 1 through 8 in set 1, cache lines 9–16 in set 2, etc., meaning 8-way associativity. An entry in cache 40 may be of varying format, such as having an address tag field, a state-bit field, an inclusivity-bit field, and a value field.

Figure 1:
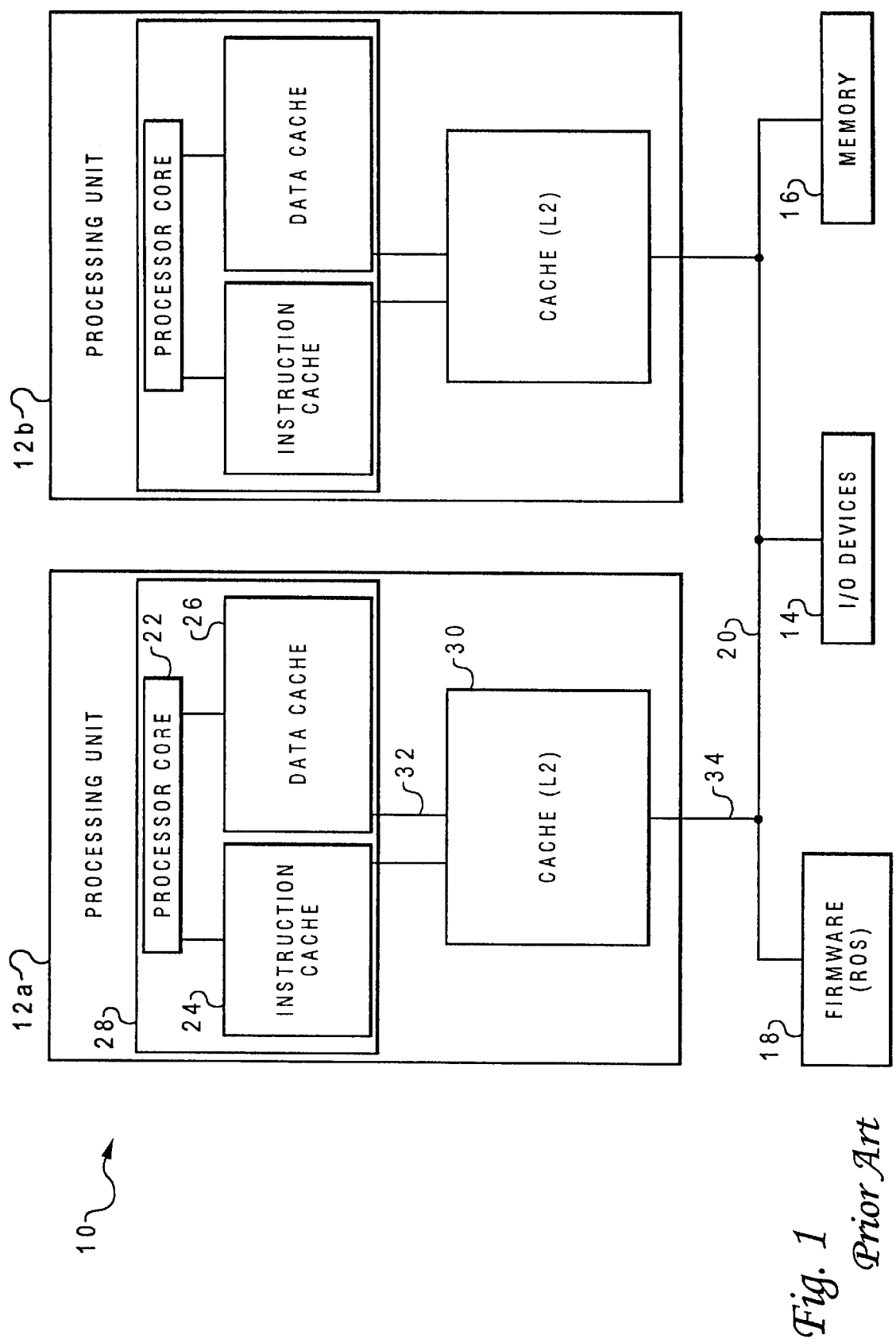
FIG. 1 is a block diagram of a prior-art multi-processor computer system.
Figure 2:
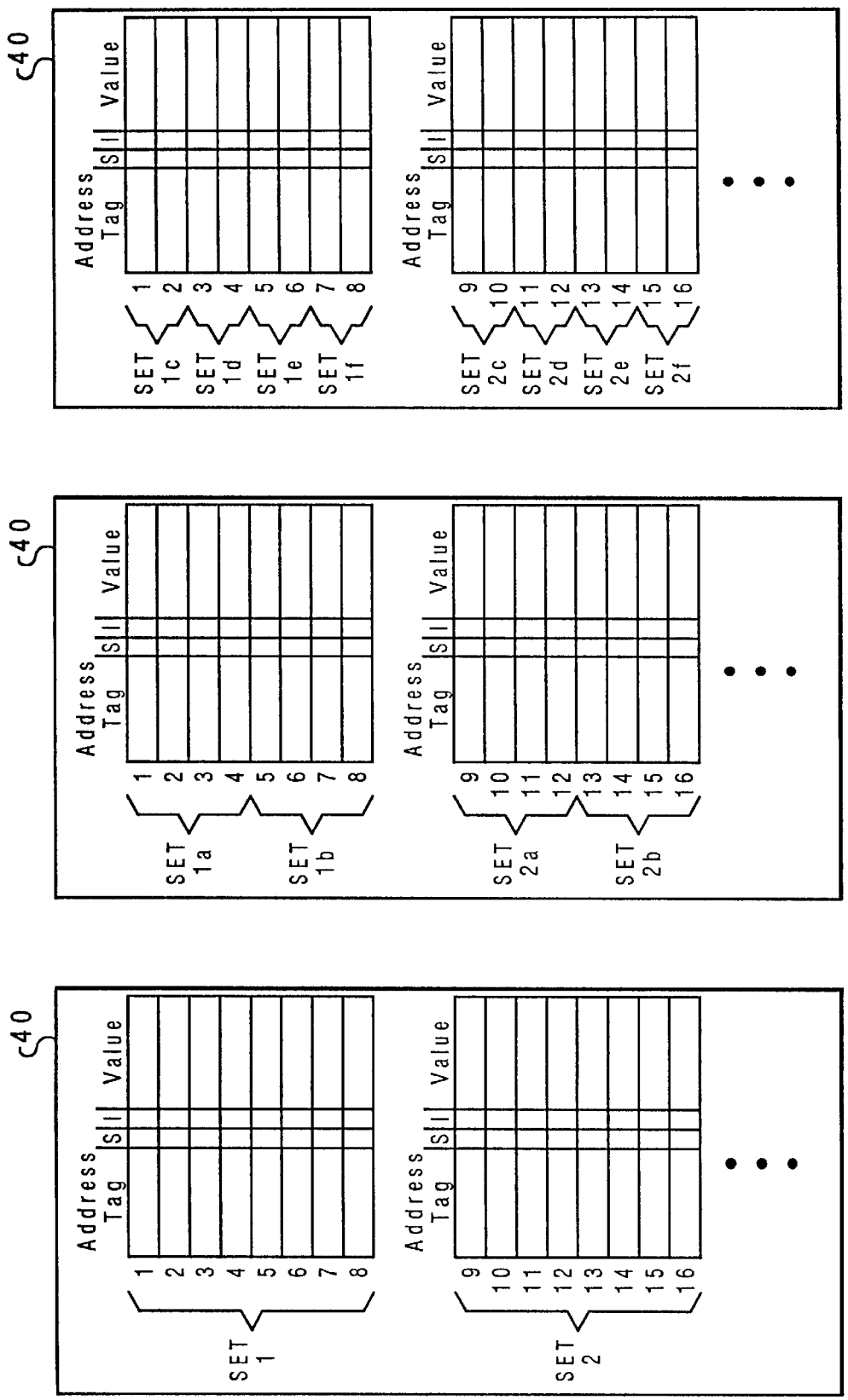
FIGS. 2a–2c are representations of a novel method of varying associativity for an associative cache.

The static image of FIG. 2a provides the benefits of a conventional 8-way associative cache, but the present invention additionally provides associative adaptability or programmability, as further shown in FIGS. 2b and 2c. In FIG. 2b, each 8-block set has been divided into two smaller sets, including sets 1a, 1b, 2a, and 2b. Each of these sets contains four blocks, so this state of cache 40 is 4-way associative. In FIG. 2c, the sets have further been subdivided to generate two blocks per set, i.e., 2-way associativity. This progression could even extend to 1-way associativity. Also, the progression could begin with a larger number of cache blocks in the largest set, e.g., 16 instead of 8.

The ability to change the level of associativity of cache 40 allows it to operate more efficiently. As noted in the Description of the Related Art, there may be certain procedures that result in strides, i.e., a cache rolling in one or two congruence classes, due, in part, to the particular associativity size. For these procedures, the strides can be eliminated or minimized by using a different associativity size. The associativity size may be optimized for different applications by providing one or more programmable bits which are used to indicate which level of associativity is desired. For example, Table 1 shows how a programmable two-bit facility may be used to implement the adaptable associativity scheme of FIGS. 2a–c:

TABLE 1

| Associativity | Program. bits | congruence classes | address bits | LRU bits |
|---|---|---|---|---|
| 8-way | 00 | N | A | 7 |
| 4-way | 01 | N × 2 | A-1 | 3 |
| 2-way | 10 | N × 4 | A-2 | 1 |
| direct mapped | 11 | N × 8 | A-3 | 0 |

The two-bit facility is set to "00" to indicate 8-way associativity, it is set to "01" to indicate 4-way associativity, it is set to "10" to indicate 2-way associativity, and it is set to "11" to indicate 1-way associativity (i.e., direct mapped). The necessary subdividing of the set is controlled by modifying the congruence-class mapping function to conveniently use one or more specific subsets of the original sets. In other words, two sets, 1a and 1b, include only cache lines that were in original set 1, and sets 1c and 1d include only cache lines that were in the first subdivided set 1a. For a cache 40 having a fixed number of cache lines, this means that the number of congruence classes will vary between N and N×8, where N is the minimum number of congruency classes dictated by the basic mapping function.

Figure 3:
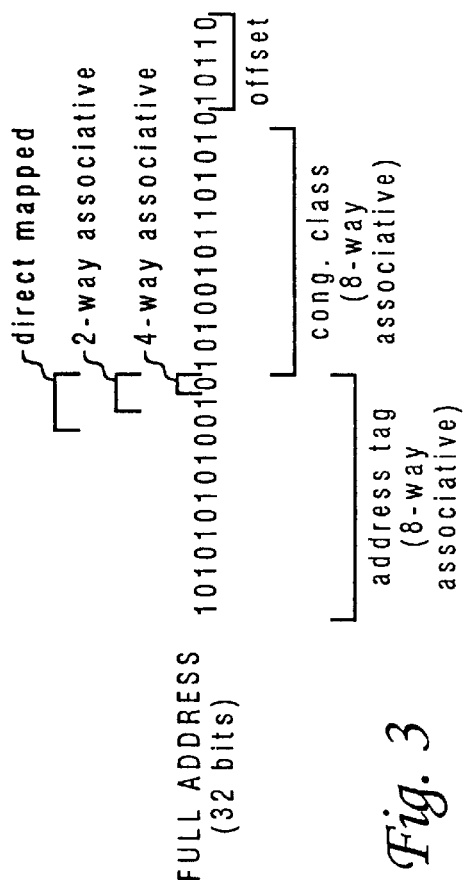
FIG. 3 depicts one method of providing programmable associativity such as that shown in FIGS. 2a–2c, using a basic congruence class mapping that is modified by creating additional classes by using bits from the address tag.

The manner in which the specific subset is identified may vary. A portion of the full address of the memory block may be used to refine the congruence class mapping. For example, a 32-bit full address might be broken down into three parts, an offset field, a congruence class field, and an address tag field, as shown in FIG. 3. The offset field, six-bits in this example, defines the exact location of the byte within the value field corresponding to the actual instruction or data. The congruence class field is used as the input operand to the mapping function and assigns the memory block to a primary set, i.e., a set having eight blocks, such as set 1. In this example, the congruence class field is 13 bits and the address tag is 13 bits for 8-way associativity, but the congruence class field effectively grows for other associativity levels by using other bits from the address tag, so the address tag field shrinks. Four-way associativity is achieved by using the last bit in the original address tag field to subdivide the 8-block sets into two smaller groups of four blocks each. Similarly, 2-way or 1-way associativity is achieved by using the second to the last bit and the third to the last bit in the original address tag field to subdivide the sets further.

Programmable associativity may be provided by either hardware or software which establishes the 2-bit facility. In the former implementation, a logic unit can collect miss information and select an associativity level based on pre-defined criteria, such as a maximum miss rate for any single congruence class, or more than a certain number of congruence classes having miss rates above one or more thresholds. This managing of the associativity can take place dynamically so that the cache responds quickly to changes in the nature of procedures running on the processor, such as, due to a change in the type of application running on the computer system. Alternatively, a set of connecting pins might be used for manual selection. A software implementation (program instructions) can similarly operate to adjust the associativity level. Application software may be provided for a particular program which is known to have procedures that can result in strides, but the application software can set the 2-bit associativity facility to a known appropriate level to lessen excess memory latencies due to strides. The application software might even adjust the associativity level intermittently based on different routines used by the program. Operating-system software also can be used to monitor address requests and determine in a predictive manner how efficient the procedures will operate at different associativity levels, and the operating system then can select the most efficient level. This technique offers real-time adjustment of the associativity level, even in the middle of program execution.

Figure 4:
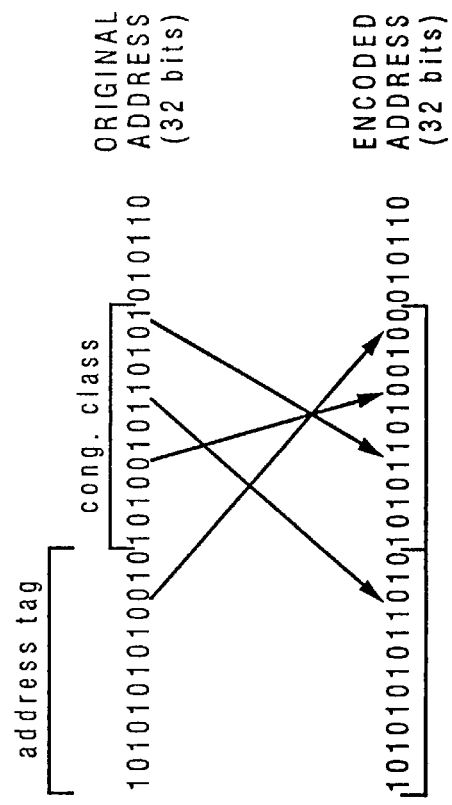
FIG. 4 depicts a novel method of providing programmable congruence classes allowing arbitrary assignment of particular addresses to particular congruency classes, by switching address bits.

The foregoing programmable associativity provides one way to affect congruency classes, that is, in the exemplary embodiment, by increasing the number of congruency classes according to a multiplicative factor. Another method for improving cache efficiency according to the present invention relates to a different aspect of congruence classes, that of the mapping function that prescribes which specific memory blocks are to be assigned to which congruency class. The prior-art mapping techniques typically involve a modulo-type function, but the cyclic nature of that function can lead to stride problems. The present invention addresses this problem by using a mapping function that allows the full or partial address to be encoded into a new, unique address, i.e., providing an arbitrary (pre-defined) assignment of particular addresses to particular congruency classes. As depicted in the example of FIG. 4, the 10th bit in the full (original) 32-bit address is shifted to the 26th bit in an encoded 32-bit address, the 26th bit in the original address is shifted to the 18th bit in the encoded address, the 18th bit in the original address is shifted to the 22nd bit in the encoded address, and the 22nd bit in the full (original) address is shifted to the 10th bit in the encoded address. This example provides a unique and arbitrary assignment of certain addresses to particular congruency classes by switching address bits.

Figure 5:
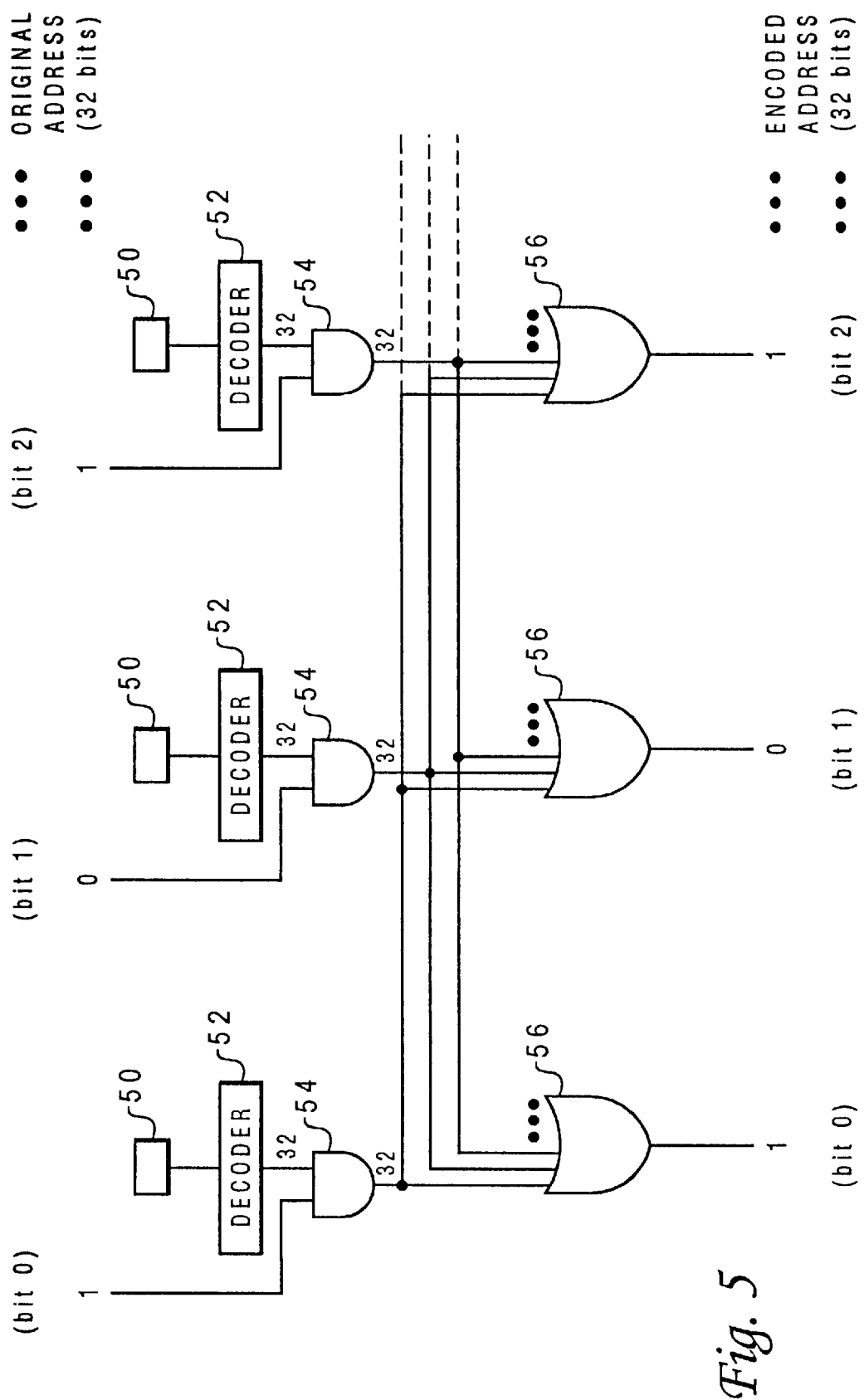
FIG. 5 is a high-level schematic diagram of one hardware implementation providing for programmable congruence classes such as that shown in FIG. 4, using an encoding value for each bit in the full address.

This programmability of congruency classes also may be achieved in hardware or software implementations. Application software can provide appropriate encoding of the address before it is sent to the cache/processor, or operating system software could monitor allocation of memory blocks and use an interpreter to modify the addresses when they are sent to the hardware. These techniques allow intermittent or real-time adjustment of the members of the congruency classes. A hardware implementation is shown in FIG. 5. A plurality of 5-bit programmable fields 50 are provided, one for each bit in the address (full or partial) which is to be encoded. Each of these 5-bit programmable fields 50 are fed into respective 5–to–32 decoders 52, with each decoder output (32 lines) being fed to a respective AND gate array 54 (32 AND gates per array). The outputs of the AND gate arrays 54 (32 lines each) branch out to a plurality of OR gates 56. Each OR gate 56 receives one input from each AND gate array 54. The outputs of the OR gates 56 provide the shifted values for the encoded address. This hardware provides programmable congruence classes by selecting appropriate values for the 5-bit programmable fields 50, and can be dynamic as well, collecting miss information and selecting an arbitrary mapping function based on predefined criteria. A flush of the cache is required with the hardware implementation before changing associativity levels to ensure coherency.

The foregoing programmable congruence class is independent of the aforementioned programmable associativity, although the two can be used in combination. For example, the programmable associativity can be used to set the two-bit associativity facility to optimize that level, and then the programmable congruence class using the 5-bit encoding fields can be used further to lessen eviction rates.

Yet another method for improving cache efficiency according to the present invention relates to use of the cache for instructions versus data. In computer systems which implement a CPU-caching structure, it is typical for caches to be predefined as a unified cache where instructions and data are always treated the same, or as a split I/D cache where a portion of the total cache RAM space (usually ½) is dedicated to instructions, and the remainder is dedicated to data. Also, in traditional split I/D cache designs, the ratio of space dedicated to instructions versus data is fixed (usually 50%/50%).

This disclosure describes a novel cache allocation design in which the instruction/data split ratio is programmable to varying degrees. In one implementation, the programmability is provided by a 2-bit I/D facility (referred to below as "$id_{13}$ ratio") which is readable and writable by software. The definition of settings of this facility shown in Table 2 below are for the exemplary implementation, although this invention could easily be adapted and/or expanded to other cache ratios:

TABLE 2

| id_ratio | Description |
|---|---|
| 00 | 100% of cache allocated in both instructions and data. |
| 01 | 50% of cache allocated to instructions ONLY 50% allocated to both instructions AND data |
| 10 | 50% of cache allocated to data ONLY 50% allocated to both instructions AND data |
| 11 | Reserved |

The programmable I/D ratio is achieved by modifying the victim replacement algorithm of a set associative cache. In the implementation below, the cache is 8-way set associative (with the 8 members denoted as a,b,c,d,e,f,g,h) and a 7-bit LRU algorithm is used. In this implementation, the normal victim selection logic is described in the following boolean equations. The following logic represents a prior-art 7-bit LRU algorithm(in these boolean equations, "^" is a logical NOT (invert), "&" is a logical AND, and "+" is a logical OR):

victim_is_member_a=^lru_bits(0) & ^lru_bits(1) & ^lru_bits(3);

victim_is_member_b=^lru_bits(0) & ^lru_bits(1) & lru_bits(3);

victim_is_member_c=^lru_bits(0) & lru_bits(1) & ^lru_bits(4);

victim_is_member_d=^lru_bits (0) & lru_bits (1) & lru_bits (4);

victim_is_member_e=lru_bits(0) & ^lru_bits(2) & ^lru_bits(5);

victim_is_member_f=lru_bits(0) & ^lru_bits(2) & lru_bits(5);

victim_is_member_g=lru_bits(0) & lru_bits(2) & ^lru_bits(6);

victim_is_member_h=lru_bits(0) & lru_bits(2) & lru_bits(6);

To modify the I/D ratio, the selected victim is confined to only certain congruence class members depending on the setting of "id_ratio" and whether the CPU is requesting an instruction read (i_read) or a data read (^i_read) as follows:

d50_mode=(id_ratio="01");

i50_mode=(id_ratio="10");

gate_abcd=^((d50_mode & ^i_read)+(i50_mode & i_read)).

The "gate_abcd" signal, if="1" allows congruence class members a, b, c, or d to be used as the victim for replacement. If "gate_abcd" is="0," then congruence class members e, f, g, or h must be used as the victim. Thus, the victim selection equations are modified as shown below:

victim_is_member_a=gate_abcd & ^lru_bits(0) & ^lru_bits(1) & ^lru_bits(3);

victim_is_member_b=gate_abcd & ^lru_bits(0) & ^lru_bits(1) & lru_bits(3);

victim_is_member_c=gate_abcd & ^lru_bits(0) & lru_bits (1) & ^lru_bits(4);

victim_is_member_d=gate_abcd & ^lru_bits(0) & lru_bits(1) & lru_bits(4);

victim_is_member_e=(^gate_abcd+lru_bits(0)) & ^lru_bits (2) & ^lru_bits(5);

victim_is_member_f=(^gate_abcd+lru_bits(0)) & ^lru_bits(2) & lru_bits(5);

victim_is_member_g=(^gate_abcd+lru_bits(0)) & lru_bits(2) & ^lru_bits(6);

victim_is_member_h=(^gate_abcd+lru_bits(0)) & lru_bits(2) & lru_bits(6);

As an example of the use of the invention described above, take the case where id_ratio="01." In this case, when the CPU requests an instruction read, then gate_abcd="1," and any of the eight congruence class members can be selected as the victim for replacement. If the CPU requests a data read, then only members e, f, g, or h can be selected as the victim. As a result, the entire cache can be used to store instructions, but only 50% of the cache can be used to store data. Thus, in this mode, the cache is "weighted" toward instructions. The foregoing example presents instruction/data cache block usage ratios of 2:1, 1:1, and 1:2. Other ratios could be provided, such as 3:1, 4:1, or 8:1, for example, by incrementing the available amount of cache by 12.5%; a 3-bit I/D would be used to provide the relative usage amounts of 12.5%, 25%, 37.5%, 50%, 62.5%, 75%, 87.5%, or 100%.

This novel cache-allocation design provides an instruction/data split ratio that is programmable. This allows software applications or operating systems to tune the weighting of instructions versus data real-time in the cache for optimal performance. The I/D cache ratio setting can be changed at any time without the need for software to save the state of the CPU and cache first. The technique also can be implemented with hardware as well, by monitoring the relative amounts of instruction reads versus data reads. Other than the LRU victim selection logic, the cache controller logic works the same way regardless of which I/D ratio mode is being used. This programmability can be adapted for use in all types of caches (in-line, lookaside, write-through, etc.). The implementation of the invention described above uses an 8-way set associative cache, but the invention could be applied to any degree of associativity (2-way or greater). Also, the implementation described above uses a 7-bit LRU algorithm, but the invention could be applied to other LRU algorithms as well. By using the victim selection logic as the means by which the variable I/D weighting is achieved, the invention can be implemented with very few logic circuits.

Still another method for improving cache efficiency according to the present invention relates to the mechanism for evicting cache blocks, in a manner other than adjusting the relative cache usage of two value classes (instructions or data). Even employing the above-described techniques for improving the efficiency of a cache, there still may be some level of striding, particularly due to a cyclical pattern arising between allocation of memory block and their respective cache blocks. It these cases, a method can be provided to further modify the cache replacement algorithm (e.g., LRU) to introduce a defined element of randomness which breaks up any inefficient cyclical evictions and thereby lessens strides.

Figure 6:
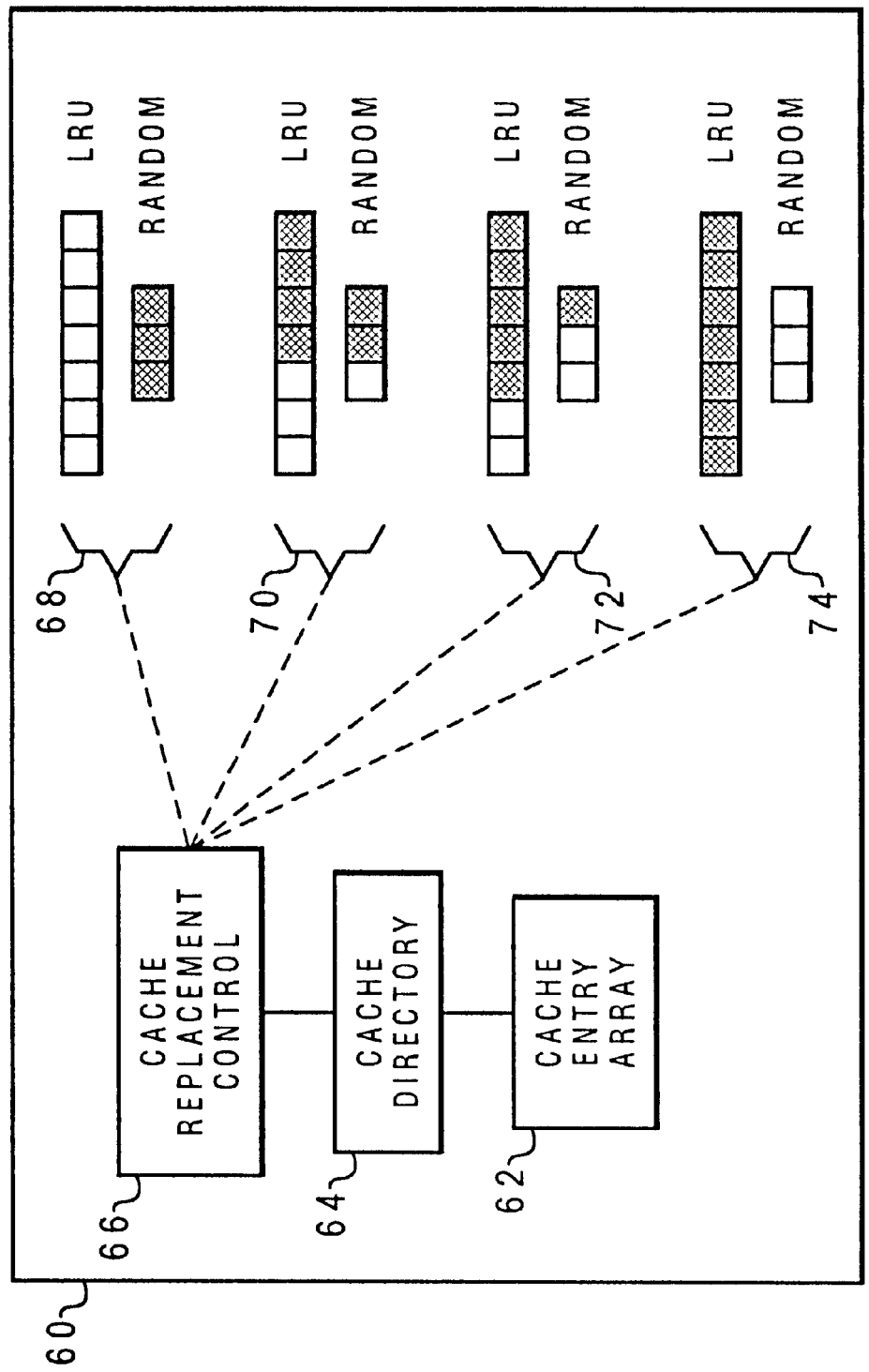
FIG. 6 is a block diagram of a novel cache having a replacement control unit which allows an element of randomness to be introduced in varying degrees to an LRU algorithm.

One embodiment of this aspect of the present invention is shown in FIG. 6. A cache 60 includes several components, including a cache entry array 62 of the various values stored in the cache, a cache directory 64 for keeping track of the entries, and a replacement control unit 66 which uses an LRU algorithm that is selectively modified by a random factor. In this embodiment, there are four possible variations of the replacement control unit to introduce the element of randomness. In the first variation 68, when no randomization is to be introduced, 7-bits are used to select the least recently used cache block in an eight-block set (i.e., the cache is 8-way associative) and no additional bits are required for any randomizer.

If a slight amount of randomization is desired, then, in the second variation 70, the replacement algorithm is modified by introducing a small amount of randomness. Only three LRU bits are used to first make a selection within a given congruence class (cache set) between four groups, each group containing one-quarter of the class, or two blocks in the case of an 8-way associative cache. After this 2-member group (subclass) is selected, a single random bit is employed to pick one of the two blocks within that group. If more randomness is desired, then the third variation 72 uses a 1-bit LRU algorithm to break up an original congruence class into two subclasses (four blocks each if the cache is 8-way associative), and two random bits are used to select one of the four members of a subclass. Finally, in the last variation 74, no LRU bits are used, and three random bits are used to determine completely the block for eviction within the eight-member class.

In FIG. 6, the LRU and random blocks are shown separately, but they can be combined into a single 7-bit field; in other words, this field is completely used for variation 68, but only four bits of this field are used in variations 70 (three LRU bits and one random bit) and 74 (two LRU bits and two random bits), and only three bits of the field are used for variation 74.

The example of FIG. 6 is for 8-way associativity, but those skilled in the art will appreciate that the invention can be applied to other set sizes. For example, in a 4-way associative set there could be three variations: a first variation using three LRU bits and no random bits, a second variation using one LRU bit and one random bit, and a third variation using no LRU bits and two random bits. A 2-way associative set could have two variations: a first variation using one LRU bit and no random bits and a second variation using no LRU bits and one random bit. This varying randomness is another way to optimize evictions, and can be used with any of the foregoing programmable associativity, programmable congruence classes, and programmable I/D ratio.

The improved cache described herein may be used as an on-board (L1) cache, or as a lower-level cache (e.g., L2). While these constructions of the cache may be used for only one or a limited number of cache levels in the cache hierarchy, those skilled in the art will appreciate that it may be preferable to use this construction for all cache levels so as to maximize the performance benefits. The present invention is generally applicable to a single processor computer system as well as a multiprocessor computer system.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is contemplated, therefore, that such modifications can be made without departing from the spirit or scope of the present invention as defined in the appended claims.

We claim:

1. A computer system comprising:
   a processor;
   a memory device;
   a cache connected to said processor and said memory device, having a plurality of cache blocks for storing memory blocks corresponding to addresses of said memory device; and
   program instructions residing in said memory device and executed by said processor, for arbitrarily assigning a given one of said addresses to a particular one of a plurality of congruence classes, wherein said program instructions arbitrarily assign said given one of said addresses to said particular one of said plurality of congruence classes by modifying said addresses to produce encoded addresses and using a preset congruence-class mapping function which operates on said encoded addresses, and said program instructions are part of application software which provides said program instructions to assign said addresses to said congruence classes based on a particular procedure of said application software which is running on said processor; and wherein a procedure is running on the processor and allocating memory blocks to the cache such that the original addresses, if applied to the mapping function, would resulting in striding of the cache, but the encoded addresses being applied to the mapping function results in less striding of the cache.

2. The computer system of claim 1 wherein said program instructions are part of operating-system software which monitors allocation of said memory blocks in said cache and provides said program instructions to assign said addresses to said congruence classes based on said allocation of said memory blocks.

3. The computer system of claim 1 wherein said program instructions modify said addresses by setting a plurality of programmable fields.

4. The computer system of claim 3 wherein a given one of said addresses has a plurality of bits, and said program instructions set one of said plurality of programmable fields for each bit in said given address.

5. The computer system of claim 3 wherein said program instructions set said plurality of programmable fields to modify said addresses by switching address bits in said addresses.

6. A method of providing congruence classes in a cache used by a processor of a computer system, the computer system further having a memory device, comprising the steps of:

loading program instructions in the processor for selectively modifying original addresses of memory blocks in the memory device to produce encoded addresses;

defining a plurality of cache congruence classes for memory blocks in the memory device using a preset mapping function which operates on the encoded addresses; such that the program instructions may be used to arbitrarily assign a given one of the original addresses to a particular one of the cache congruence classes; and such that a procedure is running on the processor and allocating memory blocks to the cache such that the original addresses, if applied to the mapping function, would resulting in striding of the cache, but the encoded addresses being applied to the mapping function results in less striding of the cache; and loading application software which provides the program instructions to modify the original addresses based on a particular procedure of the application software which is running on the processor.

7. The method of claim 6 wherein the program instructions modify the original addresses by setting a plurality of programmable fields.

8. The method of claim 7 wherein a given one of the original addresses has a plurality of bits, and the program instructions set one of the plurality of programmable fields for each bit in the given address.

9. The method of claim 7 wherein the program instructions set the plurality of programmable fields to modify the original addresses by switching address bits in the original addresses.

10. The method of claim 6 further comprising the step of loading operating-system software which monitors allocation of memory blocks in the cache and provides the program instructions to modify the original addresses based on the allocation of the memory blocks.

11. The method of claim 6 wherein the program instructions modify the original addresses by switching address bits in the original addresses.

12. The method of claim 6 comprising the further step of the program instructions modifying the original addresses in a different manner to produce different encoded addresses, and thereby define a different plurality of cache congruence classes.

* * * * *